United States Patent
Kubota et al.

(10) Patent No.: US 8,817,387 B2
(45) Date of Patent: Aug. 26, 2014

(54) IMAGING LENS

(71) Applicant: Optical Logic Inc., Ina (JP)

(72) Inventors: Yoji Kubota, Nagano (JP); Kenichi Kubota, Nagano (JP); Hitoshi Hirano, Nagano (JP)

(73) Assignee: Optical Logic Inc., Ina (JP)

( * ) Notice: Subject to any disclaimer, the term of this patent is extended or adjusted under 35 U.S.C. 154(b) by 36 days.

(21) Appl. No.: 13/648,565

(22) Filed: Oct. 10, 2012

(65) Prior Publication Data

US 2014/0098432 A1 Apr. 10, 2014

(51) Int. Cl.
*G02B 13/18* (2006.01)
*G02B 3/02* (2006.01)
*G02B 9/34* (2006.01)
*G02B 13/00* (2006.01)
*G02B 9/58* (2006.01)

(52) U.S. Cl.
CPC ............... *G02B 13/004* (2013.01); *G02B 9/58* (2013.01); *G02B 9/34* (2013.01); *G02B 13/18* (2013.01)
USPC ............ 359/715; 359/782; 359/781; 359/708

(58) Field of Classification Search
USPC .......................................... 359/781, 782, 715
See application file for complete search history.

(56) References Cited

U.S. PATENT DOCUMENTS

| | | | | |
|---|---|---|---|---|
| 7,548,385 | B2 * | 6/2009 | Hirano | 359/782 |
| 8,274,593 | B2 * | 9/2012 | Chen et al. | 348/335 |
| 8,508,861 | B2 * | 8/2013 | Tsai et al. | 359/714 |
| 8,576,497 | B2 * | 11/2013 | Hsu et al. | 359/714 |
| 2011/0157453 | A1 * | 6/2011 | Chen et al. | 348/340 |
| 2011/0176049 | A1 * | 7/2011 | Hsieh et al. | 348/340 |

FOREIGN PATENT DOCUMENTS

JP    2007-322656 A    12/2007

* cited by examiner

*Primary Examiner* — Thomas K Pham
*Assistant Examiner* — Nicholas Pasko
(74) *Attorney, Agent, or Firm* — Kubotera & Associates, LLC

(57) ABSTRACT

An imaging lens includes a first lens having negative refractive power; a second lens having positive refractive power; a third lens having positive refractive power; and a fourth lens having negative refractive power, arranged from an object side to an image plane side. In the first lens, a curvature radius of an image-side surface is positive. In the second lens, curvature radii of the object-side surface and the image-side surface are both negative. In the third lens, a curvature radius of the object-side surface is positive and a curvature radius of the image-side surface is negative. When a whole lens system has a focal length f and the first lens has a focal length f1, the imaging lens satisfies the following conditional expression:

$-3.0 < f1/f < -1.5$

3 Claims, 15 Drawing Sheets

IMAGING LENS

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for being mounted on a vehicle onboard camera, a security camera, a video conference camera, a cellular phone, a digital still camera, a portable information terminal, and a network camera and the like.

In these years, it has become rapidly popular to equip a vehicle with a vehicle onboard camera such as a back camera and a drive recorder. The back camera is used for looking at a backside of the vehicle when the vehicle is pulled back, and the drive recorder is used for recording a view in front of the vehicle for a certain period of time to deal with a potential car accident and so on. For the vehicle onboard camera described above, it is highly demanded to enable to watch and see an image in a range being as wide as possible. Therefore, for the vehicle onboard camera, it is necessary to widen an angle of view thereof.

Japanese Patent Reference has disclosed a conventional imaging lens being relatively small as well as having a wide angle of view. The conventional imaging lens is configured with four lenses. In Patent Reference, the conventional imaging lens includes, in order from an object side to an image plane side, a first lens having negative refractive power; a second lens having positive refractive power and a convex surface facing the object side; an aperture; a third lens formed as a positive meniscus lens having a convex surface facing the image plane side; and a fourth lens formed as a positive meniscus lens having a convex surface facing the object side. With the configuration described above, the second lens, third lens and the fourth lens are restricted to have the refractive powers of 1.7 or more, respectively. Accordingly, the imaging lens is able to be downsized and obtain the wide angle of view, being configured with as few as the four lenses.

Patent Reference: Japanese Patent Publication No. 2007-322656

As the resolution of the imaging element is improved drastically, it becomes necessary for the imaging lens mounted on the vehicle onboard camera and the security camera to obtain sufficient optical performance corresponding to the resolution of the imaging element thus improved. According to the conventional imaging lens in Patent Reference, it is possible to attain the wider angle of view with the small number of the lenses. However, when the first lens of the imaging lens has the negative refractive power as described in Patent Reference, field curvature and chromatic aberration caused by the first lens are necessary to be corrected by the other following lenses having the positive refractive power. In the conventional imaging lens, the field curvature and the chromatic aberration are corrected by the three lenses having the positive refractive power. In this case, both of axial and off-axis chromatic aberrations tend to remain in any manner. Therefore, it is difficult to obtain preferred aberration.

It is not a challenge only for the imaging lenses to be mounted on the vehicle onboard camera and the security camera to obtain the wide angle of view and satisfying correction of the aberration simultaneously, but is also a challenge shared with the imaging lenses to be mounted on, for example, the cameras such as the video conference camera, the cellular phone, the digital still camera, the portable information terminal, and the network camera and the like. The above mentioned cameras are required to have the wide angle of view as well as being relatively small.

In view of the problems of the conventional techniques described above, an object of the present invention is to provide an imaging lens that can satisfactorily correct aberrations while having the wide angle of view.

Further objects and advantages of the invention will be apparent from the following description of the invention.

SUMMARY OF THE INVENTION

In order to solve the above problems, according to the present invention, an imaging lens includes a first lens having negative refractive power; a second lens having positive refractive power; a third lens having positive refractive power; and a fourth lens having negative refractive power, arranged in this order from an object side to an image plane side.

The first lens is formed in a shape so that a radius of curvature on an image plane side surface thereof is positive, the second lens is formed in a shape so that a radius of curvature on the object side surface thereof and a radius of curvature on an image plane side surface thereof are both negative, and the third lens is formed in a shape so that a radius of curvature on the object side surface thereof is positive and a radius of curvature on the image plane side surface thereof is negative. With the configuration described above, when a whole lens system has a focal length f and the first lens has a focal length f1, the imaging lens in the present invention satisfies the following conditional expression (1):

$$-3.0 < f1/f < -1.5 \qquad (1)$$

The conditional expression (1) indicates conditions for downsizing the imaging lens while correcting chromatic aberration satisfactorily. When "f1/f" exceeds the upper limit value "−1.5", axial chromatic aberration is satisfactorily corrected, while off-axis chromatic aberration of magnification is not satisfactorily corrected (chromatic aberration of a short wavelength increases toward negative with respect to chromatic aberration of a reference wavelength). Therefore, it is difficult to obtain satisfactory image-forming performance. In addition, since the principal point of the whole lens system moves toward an image plane side, it is difficult to downsize the imaging lens. On the other hand, when "f1/f" is below the lower limit "−3.0", it is suitable to downsize the imaging lens and to correct the off-axis chromatic aberration of magnification sufficiently, while the axial chromatic aberration is not satisfactorily corrected. Further, a flare by the short wavelength tends to increase at the center of an image, thereby it is difficult to obtain the satisfactory image-forming performance.

In the imaging lens having the above described configuration, when the second lens has a focal length f2 and the third lens has a focal length f3, the following conditional expression (2) is preferably satisfied:

$$0.2 < f3/f2 < 0.6 \qquad (2)$$

The conditional expression (2) indicates conditions for satisfactorily correcting each aberration as well as controlling an incident angle of a light ray emerged from the imaging lens toward an imaging element so that the incident angle remains within a specific range. When "f3/f2" exceeds the upper limit value "0.6", it becomes suitable for correcting distortion while the off-axis chromatic aberration of magnification is corrected excessively at a periphery of an image (the chromatic aberration of a short wavelength increases toward positive with respect to the chromatic aberration of a reference wavelength). Further, the axial chromatic aberration is not corrected sufficiently. Therefore, it is difficult to obtain the satisfactory image-forming performance. On the other hand, when "f3/f2" is below the lower limit "0.2", it is suitable to control the incident angle of the light ray emerged from the imaging lens toward the imaging element so that the incident angle remains within the specific range while the distortion increases toward negative. In addition, it becomes difficult to correct an off-axis coma aberration. Therefore, it is also difficult to obtain the satisfactory image-forming performance.

In the imaging lens having the above described configuration, when a distance on an optical axis from the object side to the image plane side of the second lens is d3, the following conditional expression (3) is preferably satisfied:

$$0.5 < d3/f < 2.0 \quad (3)$$

The conditional expression (3) indicates conditions for downsizing the imaging lens as well as correcting the aberrations satisfactorily. When "d3/f" exceeds the upper limit value "2.0", the axial chromatic aberration is satisfactorily corrected while it becomes difficult to downsize the imaging lens since the lens system increases in size as a whole. Further, astigmatic difference also increases. Therefore, it is difficult to obtain the satisfactory image-forming performance. On the other hand, when "d3/f" is below the lower limit "0.5", it is suitable to downsize the imaging lens while the axial chromatic aberration is not satisfactorily corrected. Further, a flare by the short wavelength tends to increase at the center of the image. Furthermore, a "shading phenomenon" tends to occur since it becomes difficult to control the incident angle of the light ray emerged from the imaging lens so that the incident angle remains within the specific range. Therefore, it is also difficult to obtain the satisfactory image-forming performance.

In the imaging lens having the above described configuration, when the second lens has Abbe number vd2 and the third lens has Abbe number vd3, the following conditional expression (4) is preferably satisfied:

$$0.7 < vd2/vd3 < 1.4 \quad (4)$$

The conditional expression (4) indicates conditions for correcting the chromatic aberration satisfactorily. When "vd2/vd3" exceeds the upper limit value "1.4", the axial and off-axis chromatic aberrations are not satisfactorily corrected. Therefore, it is difficult to obtain the satisfactory image-forming performance. On the other hand, when "vd2/vd3" is below the lower limit "0.7", the image surface of the short wavelength is curved toward the object side with respect to the image surface of the reference wavelength. Further, the axial chromatic aberration is not satisfactorily corrected. Further, the flare by the short wavelength tends to increase at the center of the image. Therefore, it is also difficult to obtain the satisfactory image-forming performance.

It is possible for the imaging lens having the above described configuration to correct the chromatic aberration better by further satisfying the following conditional expression (4A):

$$0.8 < vd2/vd3 < 1.2 \quad (4A)$$

Further, in the imaging lens having the above described configuration, when the third lens has the focal length f3 and the fourth lens has a focal length f4, the following conditional expression (5) is preferably satisfied:

$$|f3/f4| < 0.8 \quad (5)$$

The conditional expression (5) indicates conditions for controlling the chromatic aberration within a preferred range.

In addition, the conditional expression (5) also indicates conditions for controlling field curvature within a preferred range while controlling the incident angle of the light ray which is emerged from the imaging lens toward the imaging element at the maximum image height so that the incident angle remains within the specific range. When the value exceeds the upper limit value "0.8", the negative refractive power of the fourth lens becomes relatively stronger, thereby excessively correcting the axial and off-axis chromatic aberrations. As a result, it is difficult to obtain the satisfactory image-forming performance. Further, the incident angle of the light ray which is emerged from the imaging lens toward the imaging element at the maximum image height becomes larger. Therefore, it is difficult to control the incident angle of the light ray which is emerged from the imaging lens toward the imaging element so that the incident angle remains within the specific range. Furthermore, the field curvature increases toward the positive direction. As a result, it is difficult to control the field curvature so that the field curvature remains within the preferred range.

According to the imaging lens of the invention, it is possible to obtain an imaging lens capable both of having a wider angle of view and correcting aberrations satisfactorily. Therefore, it is possible to provide a downsized imaging lens with satisfactorily corrected aberrations.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are schematic sectional views of imaging lenses in Numerical Data Examples 1 to 5 according to the embodiment, respectively. Since a lens configuration is basically the same among the Numerical Data Examples 1 to 5, the lens configuration of the embodiment will be described with reference to the schematic sectional view of the imaging lens in Numerical Data Example 1.

Figure 1:
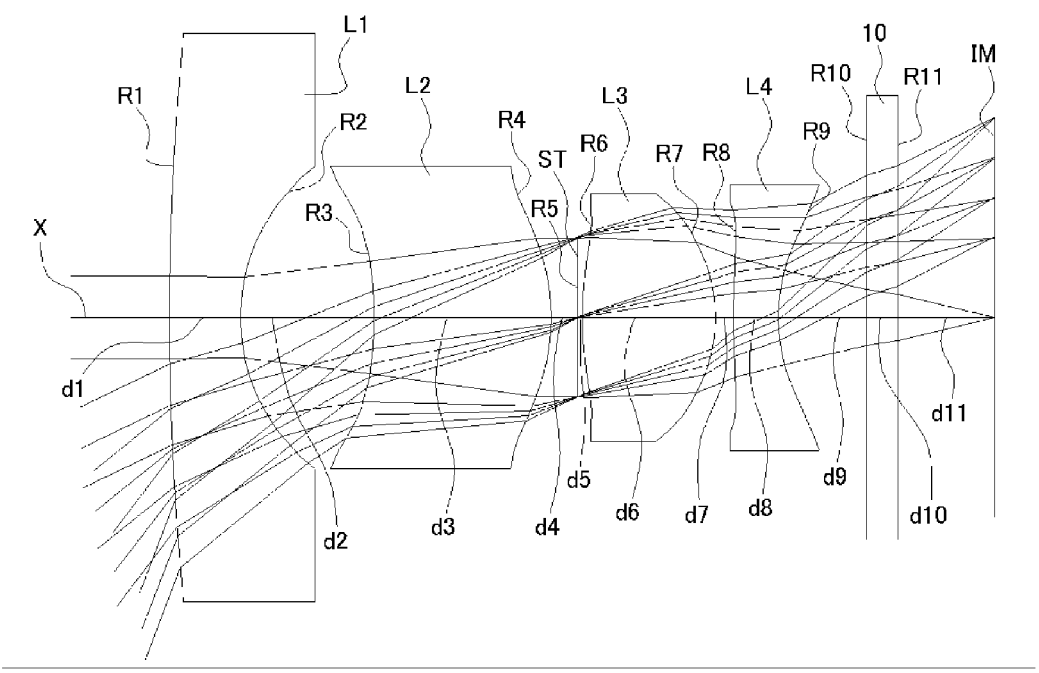
FIG. 1 is a schematic sectional view showing a configuration of an imaging lens in Numerical Data Example 1 according to an embodiment of the invention.

As shown in FIG. 1, the imaging lens of the embodiment has an first lens L1 having negative refractive power; a second lens L2 having positive refractive power; an aperture stop ST; a third lens L3 having positive refractive power; and a fourth lens L4 having negative refractive power, arranged in this order from an object side to an image plane side of the imaging lens. In the configuration described above, the first lens L1 has stronger refractive power than the second lens L2. Further, the third lens L3 has stronger refractive power than the fourth lens L4. A filter 10 is provided between the fourth lens L4 and an image plane IM. Here, the filter 10 may be optionally omitted.

In the imaging lens having the configuration described above, the first lens L1 is formed so as to have a positive curvature radius R2 on the image plane side, in other words, formed to have a shape having a concaved surface thereof facing the image plane side. In the imaging lens according to the embodiment, the first lens L1 is formed so that both of a curvature radius R1 on the object side and the curvature radius R2 on the image plane side are positive. Therefore, the first lens L1 is formed to be a meniscus lens having a convex surface thereof facing the object side in a vicinity of an optical axis X. The shape of the first lens L1 is not limited to the meniscus lens with the convex surface thereof facing the object side in the vicinity of the optical axis X, as long as the curvature radius R2 of the image plane side thereof is positive. For example, the first lens L1 may have a shape of having an infinite curvature radius on the object side, in other words, a shape of a Plano concave lens in the vicinity of the optical axis X or may have a shape having a negative curvature radius on the object side, that is, a biconcave lens in the vicinity of the optical axis X.

The second lens L2 is formed so as to have a negative curvature radius R3 thereof on the object side and a negative curvature radius R4 thereof on the image plane side, that is, formed to be a meniscus lens having a concaved surface facing the object side in the vicinity of the optical axis X.

Further, the third lens L3 is formed so that a curvature radius R6 thereof on the object side is positive and a curvature radius R7 thereof on the image plane side is negative, that is, formed to be a biconvex lens in the vicinity of the optical axis X.

The fourth lens L4 is formed so as to have a positive curvature radius R8 on the object side and a positive curvature radius R9 on the image plane side, that is, formed to be a meniscus lens having a convex surface thereof facing the object side in the vicinity of the optical axis X. The shape of the forth lens L4 is not limited to the meniscus lens with the convex surface thereof facing the object side in the vicinity of the optical axis X. For example, in Numerical Data Examples 1 and 2, the fourth lens L4 has the shape of the meniscus lens with the convex surface thereof facing the object side in the vicinity of the optical axis X while having the shape of the biconcave lens in the vicinity of the optical axis X in Numerical Data Example 3. Further, in Numerical Data Examples 4 and 5, the fourth lens L4 has the shape of a meniscus lens with the concaved surface thereof facing the object side in the vicinity of the optical axis X.

In the imaging lens according to Numerical Data Examples 1 to 4, the third lens L3 and the fourth lens L4 are arranged to be separated from each other. It is not necessary to arrange the third lens L3 and the fourth lens L4 to be separated from each other. The third lens L3 and the fourth lens L4 may be bonded so as to form a bonded lens. In Numerical Data Example 5, the third lens L3 and the fourth lens L4 are configured as the bonded lens.

The imaging lens according to the embodiment satisfies the following conditional expressions (1) to (5). Therefore, according to the imaging lens in the embodiment, it is possible to attain widening an angle of view thereof as well as satisfactorily correcting aberrations thereof.

$$-3.0 < f1/f < -1.5 \tag{1}$$

$$0.2 < f3/f2 < 0.6 \tag{2}$$

$$0.5 < d3/f < 2.0 \tag{3}$$

$$0.7 < vd2/vd3 < 1.4 \tag{4}$$

$$|f3/f4| < 0.8 \tag{5}$$

f: Focal length of the whole lens system
f1: Focal length of the first lens L1
f2: Focal length of the second lens L2
f3: Focal length of the third lens L3
f4: Focal length of the fourth lens L4
vd2: Abbe number with respect to a d line of the second lens L2
vd3: Abbe number with respect to the d line of the third lens L3
d3: Distance from the object side to the image plane side of the second lens L2 on the optical axis X (thickness)

In addition to the conditional expressions shown above, the imaging lens according to the embodiment satisfies the following conditional expression (4A) in order to correct chromatic aberration thereof more satisfactorily:

$$0.8 < vd2/vd3 < 1.2 \tag{4A}$$

Here, it is not necessary to satisfy all of the conditional expressions shown above. Upon satisfying any single one of the conditional expressions individually, it is possible to obtain an effect corresponding to the conditional expression thus satisfied.

In the embodiment, each lens has a lens surface that is an aspheric surface as necessary. A shape of the aspheric surfaces applied to the lens surfaces may be expressed as follows, wherein Z represents an axis in the optical axis direction, H represents a height in a direction perpendicular to the optical axis, k represents a conical coefficient, and $A_4, A_6, A_8,$ and $A_{10}$ represent aspheric coefficients:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} \qquad \text{[Formula 1]}$$

Next, Numerical Data Examples of the embodiment will be described. In each of the Numerical Data Examples, f represents a focal length of the whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for the d line, and νd represents Abbe number for the d line, respectively. Further, an * (asterisk) affixed to a surface number i denotes the aspheric surface.

Numerical Data Example 1

Basic lens data are shown below.

f = 2.00 mm, Fno = 2.15, ω = 76.7°
Unit: mm

Surface Data

| Surface Number i | R | d | Nd | νd |
|---|---|---|---|---|
| (Object) | ∞ | ∞ | | |
| 1 | 32.33 | 0.80 | 1.593 | 68.6 |
| 2 | 2.15 | 1.50 | | |
| 3* | −5.42 | 2.00 | 1.531 | 56.0(=νd2) |
| 4* | −2.38 | 0.30 | | |
| 5 (aperture) | ∞ | 0.05 | | |
| 6* | 3.97 | 1.50 | 1.531 | 56.0(=νd3) |
| 7* | −1.62 | 0.20 | | |
| 8* | 9.13 | 0.50 | 1.621 | 24.0 |
| 9* | 1.80 | 1.00 | | |
| 10 | ∞ | 0.35 | 1.516 | 64.1 |
| 11 | ∞ | 1.08 | | |
| (Image Plane) | ∞ | | | |

$f1 = -3.92$ mm
$f2 = 6.53$ mm
$f3 = 2.39$ mm
$f4 = -3.71$ mm

Aspheric Surface Data

Third Surface $k = 0.000, A_4 = -4.469E-02, A_6 = -1.383E-03, A_8 = 8.312E-04, A_{10} = 6.779E-04$ Fourth Surface $k = -5.000, A_4 = -4.687E-02, A_6 = 1.569E-02$ Sixth Surface $k = 0.000, A_4 = -2.545E-02, A_6 = 3.733E-03, A_8 = 4.286E-03, A_{10} = -1.096E-02$ Seventh Surface $k = -8.500E-01, A_4 = 2.893E-02, A_6 = -1.226E-02, A_8 = -5.113E-03, A_{10} = 2.004E-04$ Eighth Surface $k = -5.000E-01, A_4 = -1.136E-02, A_6 = -1.067E-02, A_8 = -6.037E-03$ Ninth Surface $k = -1.000, A_4 = -2.118E-02, A_6 = -1.123E-03, A_8 = -1.726E-03$ The values of the respective conditional expressions are as follows:

$f1/f = -1.96$ $f3/f2 = 0.37$ $d3/f = 1.00$ $vd2/vd3 = 1.00$ $|f3/f4| = 0.64$

Accordingly, the imaging lens of this Numerical Data Example 1 satisfies the respective conditional expressions (1) to (5) and (4A). In addition, a distance on the optical axis X from the surface of the first lens L1 on the object side to the image plane IM is 9.16 mm in air, and therefore the size of the imaging lens is suitably reduced.

Figure 2:
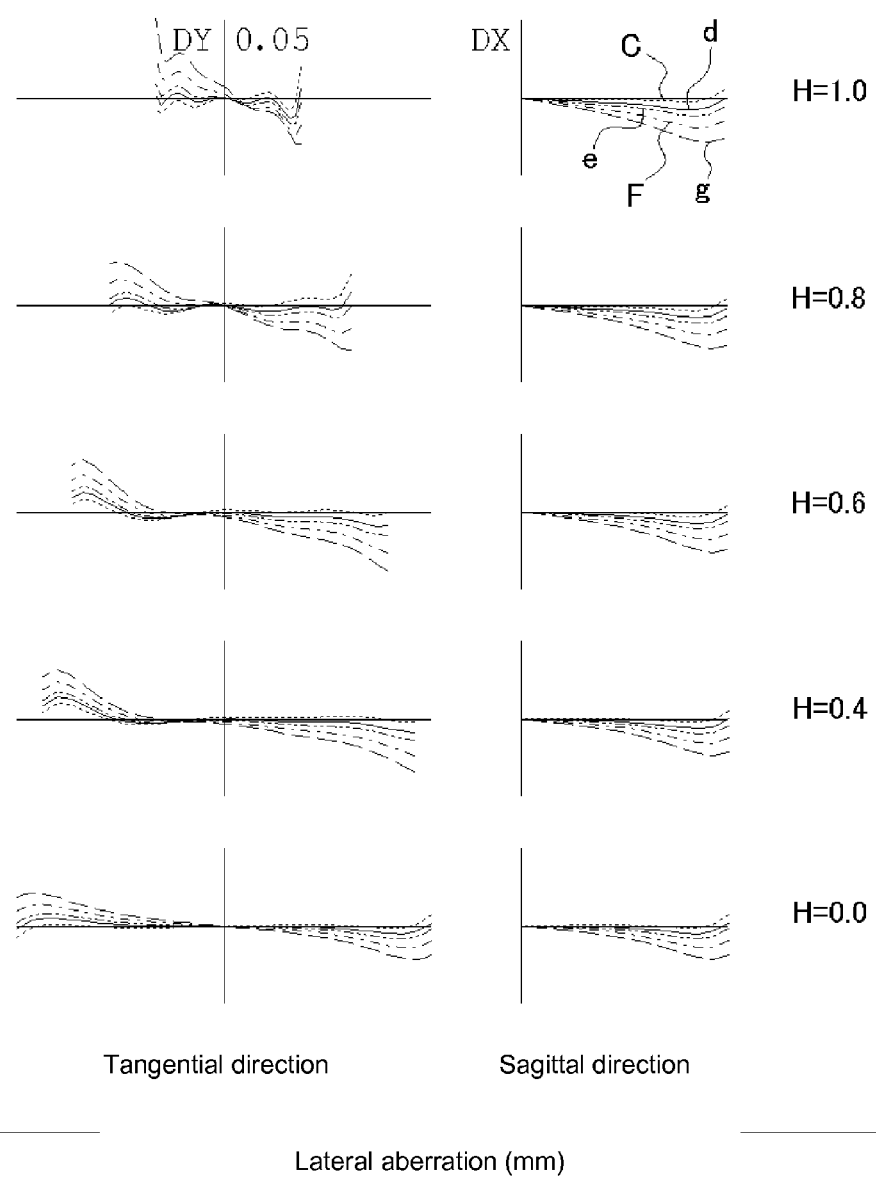
FIG. 2 is an aberration diagram showing a lateral aberration of the imaging lens of FIG. 1.

FIG. 2 shows a lateral aberration that corresponds to a ratio H of each image height to the maximum image height (hereinafter referred to as "image height ratio H") in the imaging lens of Numerical Data Example 1 by dividing into a tangential direction and sagittal direction (which is also the same in FIGS. 5, 8, 11, and 14).

Figure 3:
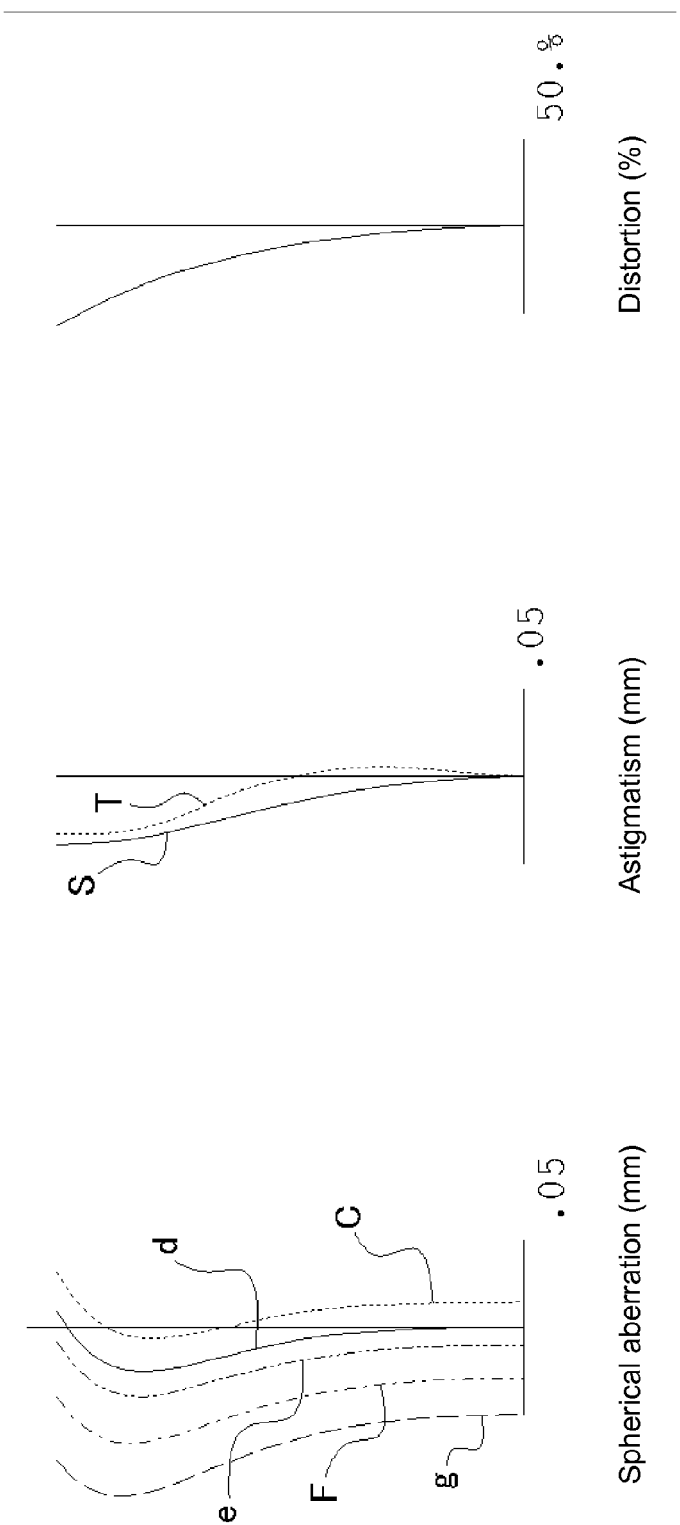
FIG. 3 is an aberration diagram showing a spherical aberration, an astigmatism, and a distortion of the imaging lens of FIG. 1.
Figure 4:
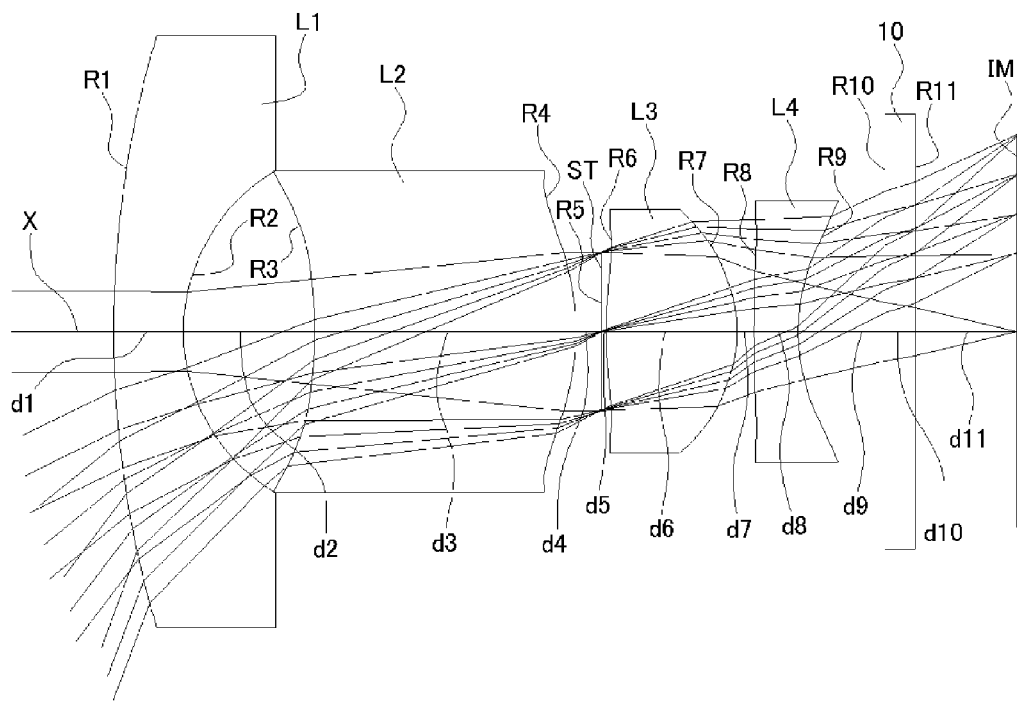
FIG. 4 is a schematic sectional view showing a configuration of an imaging lens in Numerical Data Example 2.

Furthermore, FIG. 3 shows a spherical aberration (mm), an astigmatism (mm), and a distortion (%) of the imaging lens of Numerical Data Example 1, respectively. In the aberration diagrams, lateral aberration diagrams and spherical aberration diagrams show aberrations for a g line (435.84 nm), an F line (486.13 nm), an e line (546.07 nm), the d line (587.56 nm), and a C line (656.27 nm), and astigmatism diagram shows the aberration on the sagittal image surface S and the aberration on the tangential image surface T, respectively (which are the same in FIGS. 6, 9, 12 and 15). As shown in FIGS. 2 and 3, in the imaging lens according to the Numerical Data Example 1, the image surface is satisfactorily corrected and each of the aberrations is suitably corrected.

Numerical Data Example 2

Basic lens data are shown below.

f = 2.00 mm, Fno = 2.15, ω = 77.4°
Unit: mm

Surface Data

| Surface Number i | R | d | Nd | νd |
|---|---|---|---|---|
| (Object) | ∞ | ∞ | | |
| 1 | 12.00 | 0.80 | 1.593 | 68.6 |
| 2 | 2.15 | 1.50 | | |
| 3* | −7.14 | 3.00 | 1.618 | 63.4(=νd2) |
| 4* | −3.03 | 0.30 | | |
| 5 (aperture) | ∞ | 0.05 | | |
| 6* | 4.63 | 1.50 | 1.531 | 56.0(=νd3) |
| 7* | −1.57 | 0.20 | | |
| 8* | 30.98 | 0.50 | 1.621 | 24.0 |
| 9* | 2.09 | 1.00 | | |
| 10 | ∞ | 0.35 | 1.516 | 64.1 |
| 11 | ∞ | 1.16 | | |
| (Image Plane) | ∞ | | | |

$f1 = -4.56$ mm
$f2 = 6.65$ mm
$f3 = 2.41$ mm
$f4 = -3.63$ mm

Aspheric Surface Data

Third Surface $k = 0.000, A_4 = -2.489E-02, A_6 = -1.369E-03, A_8 = 1.461E-04, A_{10} = 2.033E-04$ Fourth Surface $k = -5.000, A_4 = -2.740E-02, A_6 = 9.963E-03$ Sixth Surface $k = 0.000, A_4 = -3.940E-02, A_6 = 2.291E-03, A_8 = 7.013E-03, A_{10} = -1.072E-02$ -continued f = 2.00 mm, Fno = 2.15, ω = 77.4°
Unit: mm Seventh Surface k = −8.500E−01, $A_4$ = 3.626E−02, $A_6$ = −1.511E−02, $A_8$ = −2.965E−03, $A_{10}$ = 2.036E−04
Eighth Surface k = −5.000E−01, $A_4$ = 1.745E−02, $A_6$ = −6.497E−03, $A_8$ = −3.535E−03
Ninth Surface k = −1.000, $A_4$ = −9.510E−03, $A_6$ = 7.208E−03, $A_8$ = −4.363E−03

The values of the respective conditional expressions are as follows:

$f1/f = -2.28$ $f3/f2 = 0.36$ $d3/f = 1.50$ $vd2/vd3 = 1.13$ $|f3/f4| = 0.66$

Accordingly, the imaging lens of this Numerical Data Example 2 satisfies the respective conditional expressions (1) to (5) and (4A). In addition, the distance on the optical axis X from the surface of the first lens L1 on the object side to the image plane IM is 10.24 mm in air, and therefore the size of the imaging lens is suitably reduced.

Figure 5:
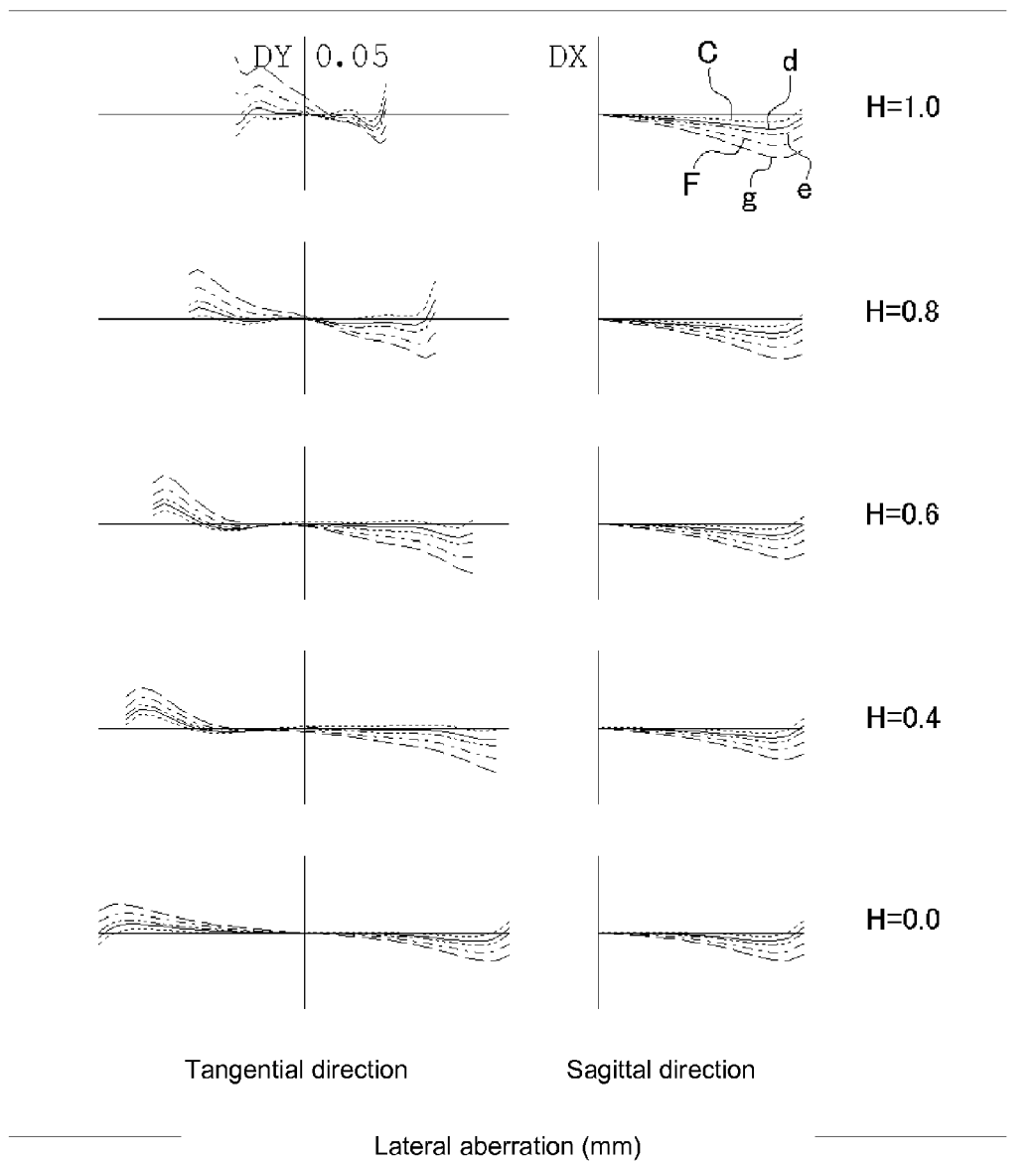
FIG. 5 is an aberration diagram showing a lateral aberration of the imaging lens of FIG. 4.
Figure 6:
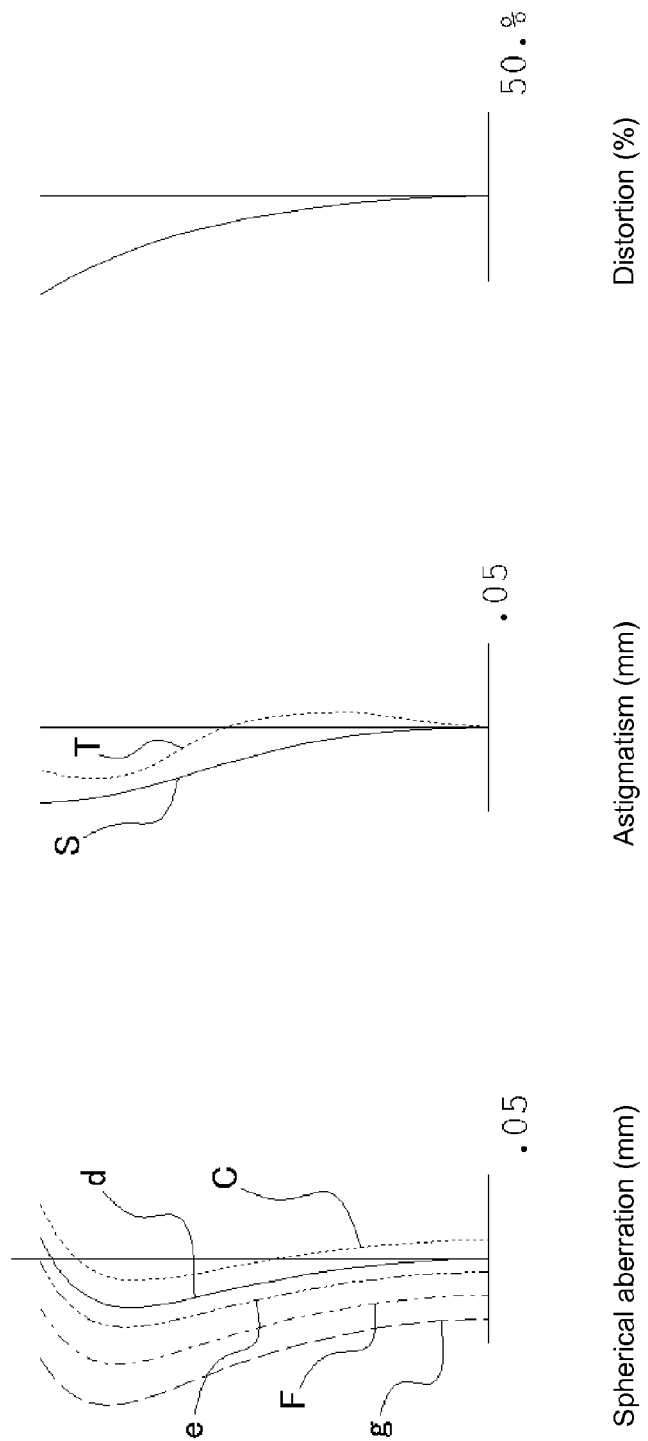
FIG. 6 is an aberration diagram showing a spherical aberration, an astigmatism, and a distortion of the imaging lens of FIG. 4.
Figure 7:
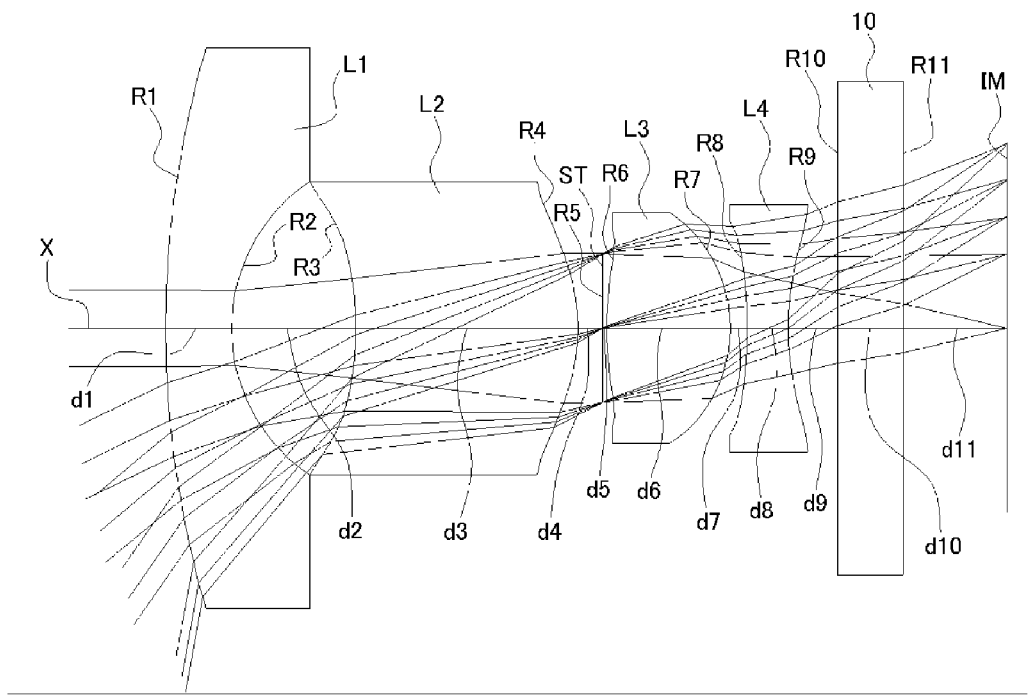
FIG. 7 is a schematic sectional view showing a configuration of an imaging lens in Numerical Data Example 3.

FIG. 5 shows the lateral aberrations corresponding to the image height ratio H in the imaging lens of Numerical Data Example 2. Furthermore, FIG. 6 shows the spherical aberration (mm), the astigmatism (mm), and the distortion (%) of the imaging lens of Numerical Data Example 2, respectively. As shown in FIGS. 5 and 6, in the imaging lens according to the Numerical Data Example 2, the image surface is satisfactorily corrected and each of the aberrations is suitably corrected similarly to Numerical Data Example 1.

Numerical Data Example 3

Basic lens data are shown below.

f = 1.99 mm, Fno = 2.15, ω = 88.7°
Unit: mm

Surface Data

| Surface Number i | R | d | Nd | vd |
|---|---|---|---|---|
| (Object) | ∞ | ∞ | | |
| 1 | 12.00 | 0.80 | 1.593 | 68.6 |
| 2 | 2.15 | 1.50 | | |
| 3* | −5.16 | 2.70 | 1.531 | 56.0(=vd2) |
| 4* | −2.33 | 0.30 | | |
| 5 (aperture) | ∞ | 0.05 | | |
| 6* | 4.27 | 1.50 | 1.531 | 56.0(=vd3) |
| 7* | −1.58 | 0.20 | | |
| 8* | −6.09 | 0.50 | 1.621 | 24.0 |
| 9* | 3.55 | 0.60 | | |
| 10 | ∞ | 0.80 | 1.516 | 64.1 |
| 11 | ∞ | 1.25 | | |
| (Image Plane) | ∞ | | | | f1 = −4.56 mm
f2 = 6.02 mm
f3 = 2.38 mm
f4 = −3.54 mm

Aspheric Surface Data

Third Surface k = 0.000, $A_4$ = −3.085E−02, $A_6$ = −1.244E−03, $A_8$ = 1.103E−04, $A_{10}$ = 3.100E−04
Fourth Surface k = −5.000, $A_4$ = −3.090E−02, $A_6$ = 9.328E−03
Sixth Surface k = 0.000, $A_4$ = −1.476E−02, $A_6$ = −2.348E−03, $A_8$ = 3.521E−04, $A_{10}$ = −1.116E−02
Seventh Surface k = −8.500E−01, $A_4$ = 2.080E−02, $A_6$ = −1.033E−02, $A_8$ = −3.214E−03, $A_{10}$ = −1.699E−03
Eighth Surface k = −5.000E−01, $A_4$ = 8.255E−03, $A_6$ = −5.242E−03, $A_8$ = −8.714E−03
Ninth Surface k = −1.000, $A_4$ = 1.527E−03, $A_6$ = −2.682E−03, $A_8$ = −2.160E−03

The values of the respective conditional expressions are as follows:

$f1/f = -2.29$ $f3/f2 = 0.40$ $d3/f = 1.36$ $vd2/vd3 = 1.00$ $|f3/f4| = 0.67$

Accordingly, the imaging lens of this Numerical Data Example 3 satisfies the respective conditional expressions (1) to (5) and (4A). In addition, the distance on the optical axis X from the surface of the first lens L1 on the object side to the image plane IM is 9.93 mm in air, and therefore the size of the imaging lens is suitably reduced.

Figure 8:
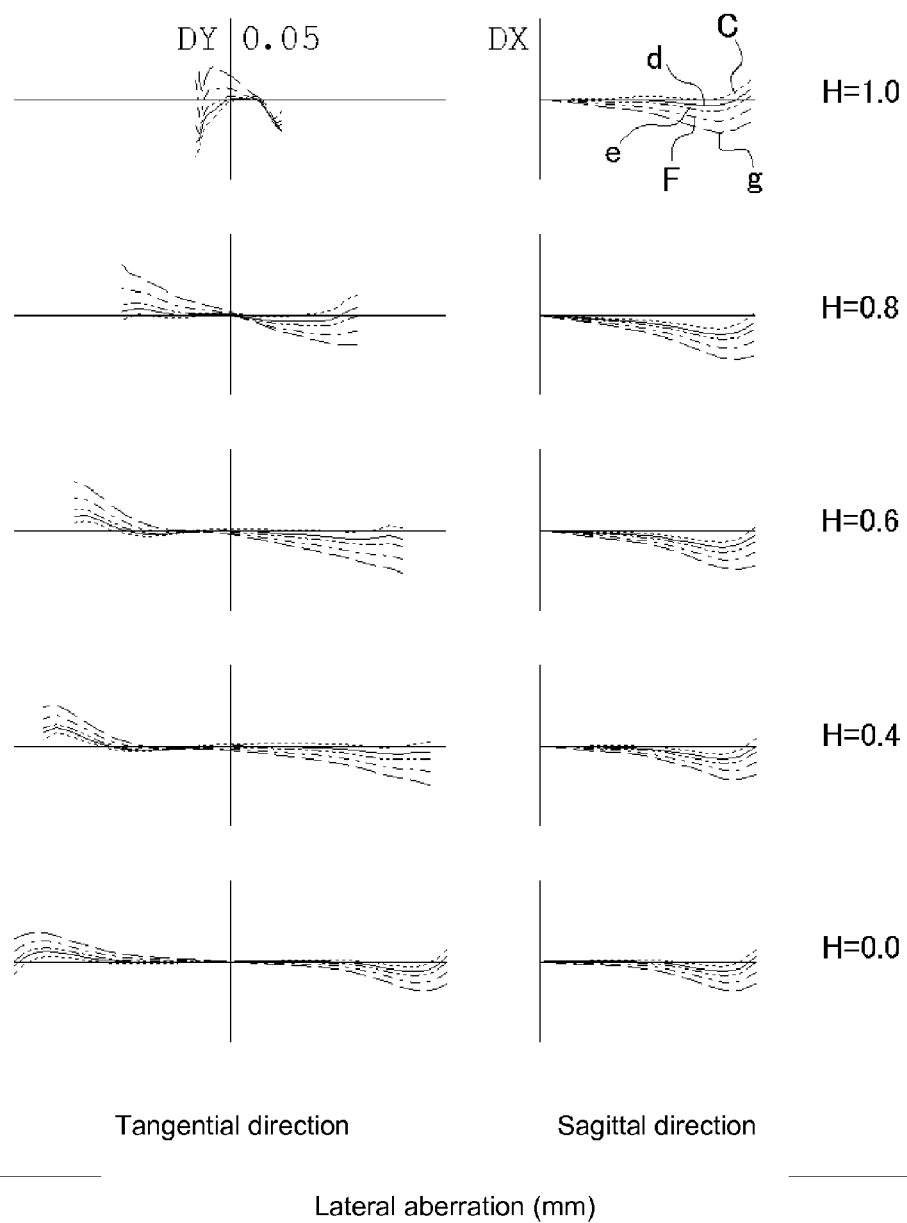
FIG. 8 is an aberration diagram showing a lateral aberration of the imaging lens of FIG. 7.
Figure 9:
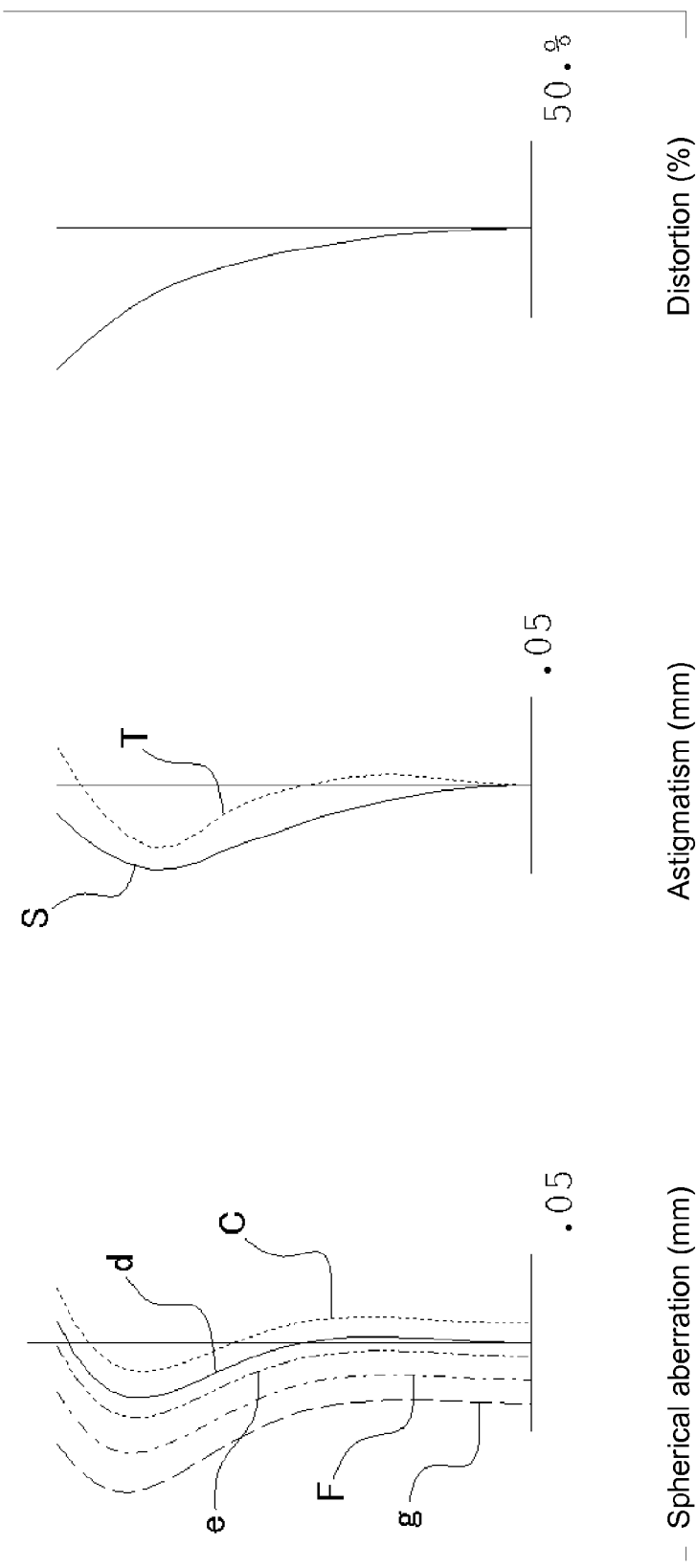
FIG. 9 is an aberration diagram showing a spherical aberration, an astigmatism, and a distortion of the imaging lens of FIG. 7.
Figure 10:
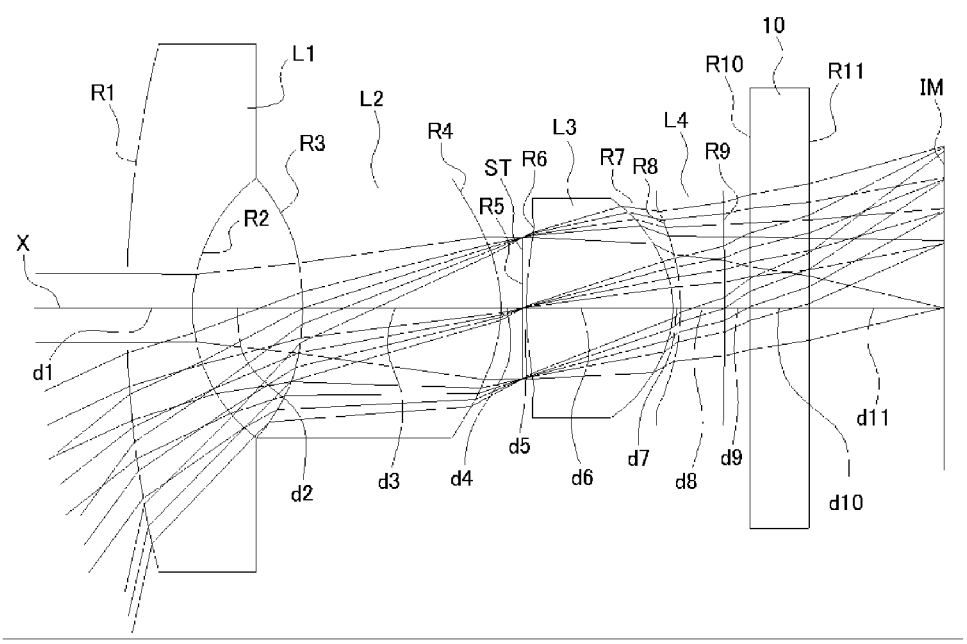
FIG. 10 is a schematic sectional view showing a configuration of an imaging lens in Numerical Data Example 4.

FIG. 8 shows the lateral aberrations corresponding to the image height ratio H in the imaging lens of Numerical Data Example 3. Furthermore, FIG. 9 shows the spherical aberration (mm), the astigmatism (mm), and the distortion (%) of the imaging lens of Numerical Data Example 3, respectively. As shown in FIGS. 8 and 9, in the imaging lens according to the Numerical Data Example 3, the image surface is satisfactorily corrected and each of the aberrations is suitably corrected similarly to Numerical Data Example 1.

Numerical Data Example 4

Basic lens data are shown below.

f = 2.04 mm, Fno = 2.15, ω = 85.9°
Unit: mm

Surface Data

| Surface Number i | R | d | Nd | vd |
|---|---|---|---|---|
| (Object) | ∞ | ∞ | | |
| 1 | 15.00 | 0.90 | 1.623 | 58.1 |
| 2 | 2.25 | 1.50 | | |
| 3* | −3.92 | 2.70 | 1.531 | 56.0(=vd2) |
| 4* | −2.04 | 0.30 | | |
| 5 (aperture) | ∞ | 0.05 | | |
| 6* | 5.30 | 2.00 | 1.531 | 56.0(=vd3) |
| 7* | −1.40 | 0.10 | | |
| 8 | −3.08 | 0.60 | 1.923 | 20.9 |
| 9 | −75.07 | 0.35 | | |
| 10 | ∞ | 0.80 | 1.516 | 64.1 |
| 11 | ∞ | 1.84 | | |
| (Image Plane) | ∞ | | | | f1 = −4.37 mm
f2 = 5.35 mm
f3 = 2.33 mm
f4 = −3.49 mm

Aspheric Surface Data

Third Surface $k = 0.000, A_4 = -2.809E-02, A_6 = 1.617E-03, A_8 = 3.060E-04, A_{10} = -1.356E-05$ Fourth Surface $k = -5.000, A_4 = -2.783E-02, A_6 = 3.935E-03$ Sixth Surface $k = 0.000, A_4 = 1.718E-02, A_6 = -1.220E-02, A_8 = -8.142E-03, A_{10} = -1.365E-03$ Seventh Surface $k = -8.500E-01, A_4 = 1.698E-02, A_6 = -2.059E-03, A_8 = -1.075E-03, A_{10} = -7.310E-04$ The values of the respective conditional expressions are as follows:

$f1/f=-2.14$ $f3/f2=0.44$ $d3/f=1.32$ $vd2/vd3=1.00$ $|f3/f4|=0.67$

Accordingly, the imaging lens of this Numerical Data Example 4 satisfies the respective conditional expressions (1) to (5) and (4A). In addition, the distance on the optical axis X from the surface of the first lens L1 on the object side to the image plane IM is 10.87 mm in air, and therefore the size of the imaging lens is suitably reduced.

Figure 11:
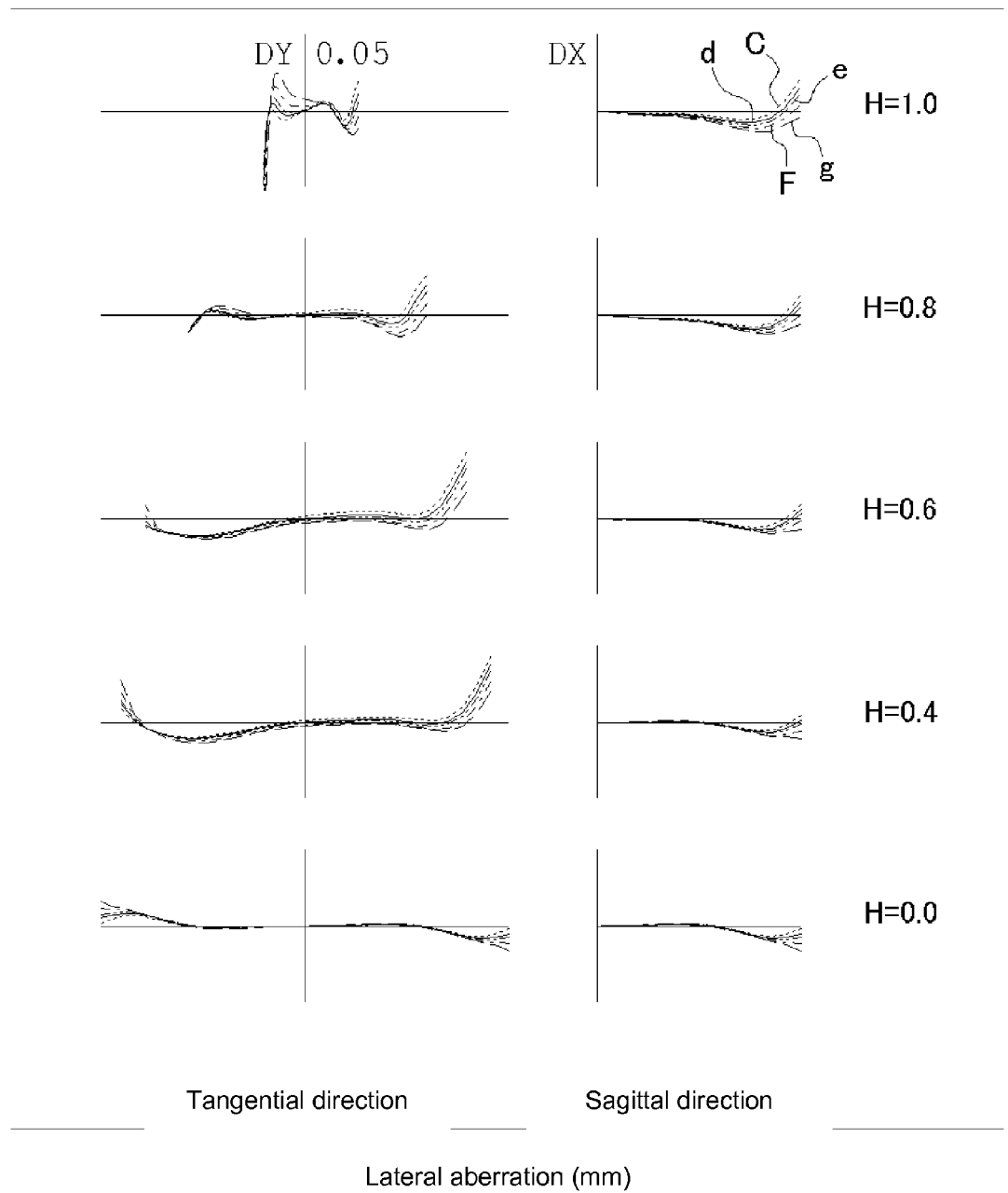
FIG. 11 is an aberration diagram showing a lateral aberration of the imaging lens of FIG. 10.
Figure 12:
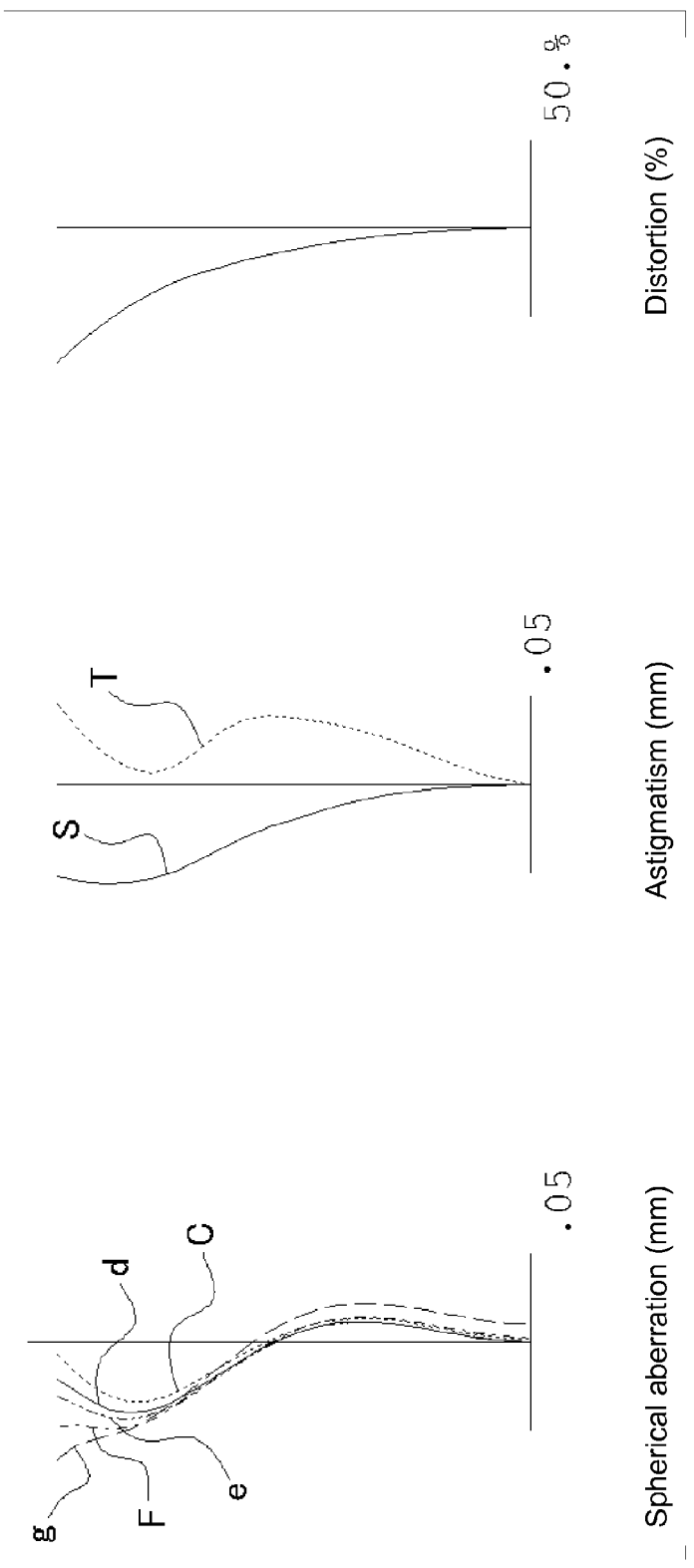
FIG. 12 is an aberration diagram showing a spherical aberration, an astigmatism, and a distortion of the imaging lens of FIG. 10.
Figure 13:
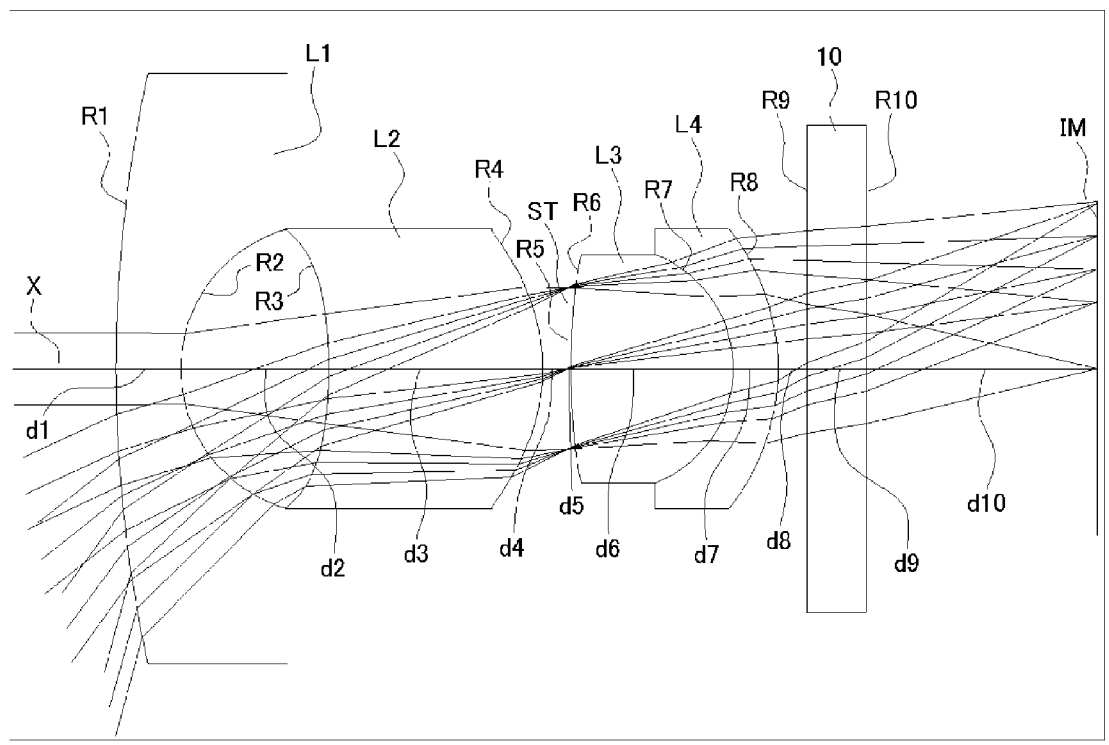
FIG. 13 is a schematic sectional view showing a configuration of an imaging lens in Numerical Data Example 5.

FIG. 11 shows the lateral aberrations corresponding to the image height ratio H in the imaging lens of Numerical Data Example 4. Furthermore, FIG. 12 shows the spherical aberration (mm), the astigmatism (mm), and the distortion (%) of the imaging lens of Numerical Data Example 4, respectively. As shown in FIGS. 11 and 12, in the imaging lens according to the Numerical Data Example 4, the image surface is satisfactorily corrected and each of the aberrations is suitably corrected similarly to Numerical Data Example 1.

Numerical Data Example 5

Basic lens data are shown below.

f = 2.11 mm, Fno = 2.15, ω = 83.0°
Unit: mm

Surface Data

| Surface Number i | R | d | Nd | vd |
|---|---|---|---|---|
| (Object) | ∞ | ∞ | | |
| 1 | 18.62 | 0.88 | 1.593 | 68.6 |
| 2 | 1.97 | 2.00 | | |
| 3* | −7.44 | 2.90 | 1.531 | 56.0(=vd2) |
| 4* | −2.59 | 0.33 | | |
| 5 (aperture) | ∞ | 0.06 | | |
| 6* | 11.24 | 2.20 | 1.618 | 63.4(=vd3) |
| 7 | −1.66 | 0.60 | 1.847 | 23.8 |
| 8 | −3.05 | 0.40 | | |
| 9 | ∞ | 0.80 | 1.516 | 64.1 |
| 10 | ∞ | 3.13 | | |
| (Image Plane) | ∞ | | | | f1 = −3.80 mm
f2 = 6.20 mm
f3 = 2.51 mm
f4 = −5.39 mm

Aspheric Surface Data

Third Surface $k = -5.000E-01, A_4 = -1.844E-02, A_6 = 7.220E-04, A_8 = -1.094E-03, A_{10} = 8.869E-05$ Fourth Surface $k = -5.000, A_4 = -2.486E-02, A_6 = 2.156E-03, A_8 = 1.000E-04$ Sixth Surface $k = -8.500E-01, A_4 = 6.933E-03, A_6 = -3.864E-03, A_8 = 1.831E-03, A_{10} = -2.011E-04$ The values of the respective conditional expressions are as follows:

$f1/f=-1.80$ $f3/f2=0.40$ $d3/f=1.37$ $vd2/vd3=0.88$ $|f3/f4|=0.47$

Accordingly, the imaging lens of this Numerical Data Example 5 satisfies the respective conditional expressions (1) to (5) and (4A). In addition, the distance on the optical axis X from the surface of the first lens L1 on the object side to the image plane IM is 13.03 mm in air, and therefore the size of the imaging lens is suitably reduced.

Figure 14:
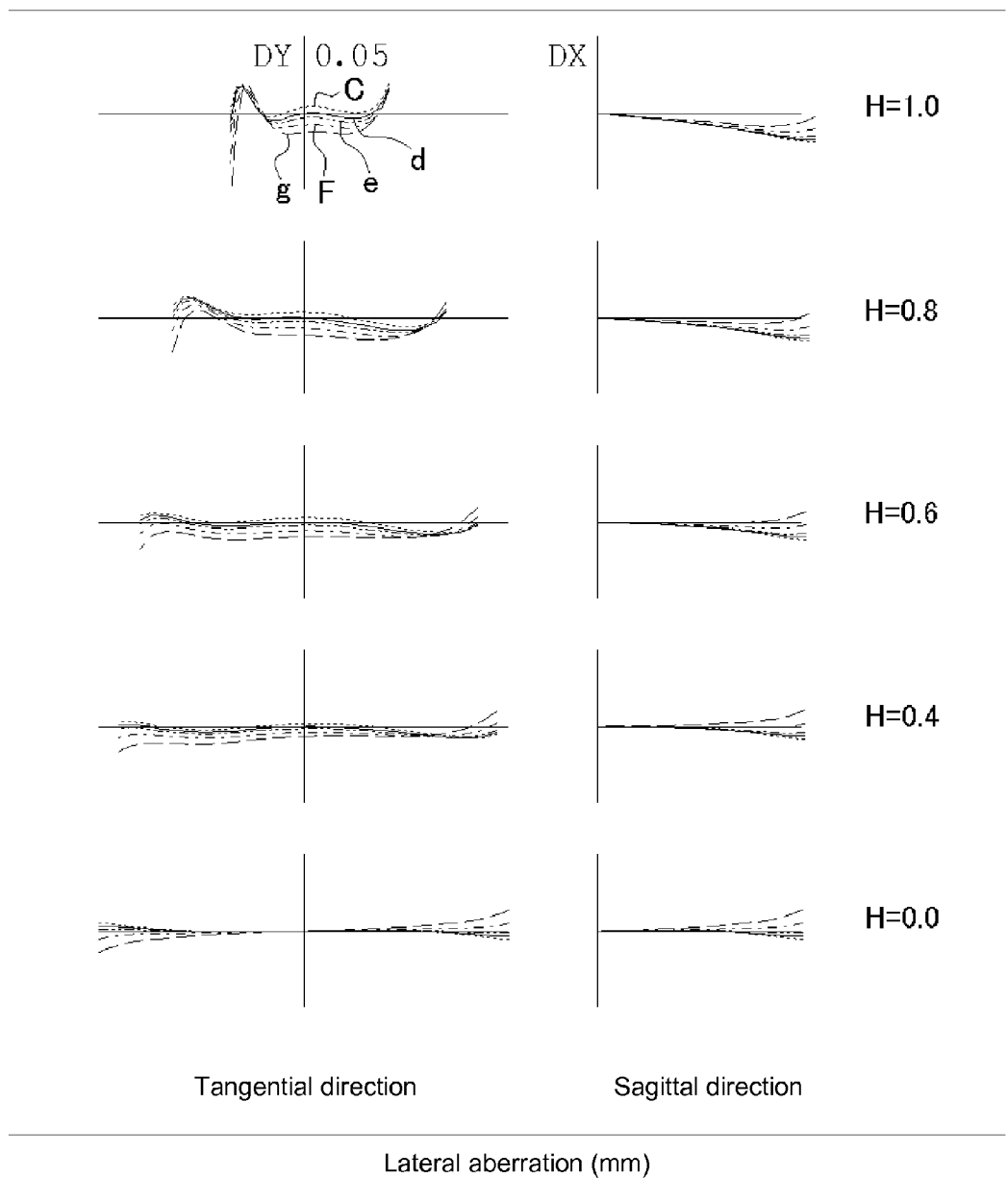
FIG. 14 is an aberration diagram showing a lateral aberration of the imaging lens of FIG. 13.
Figure 15:
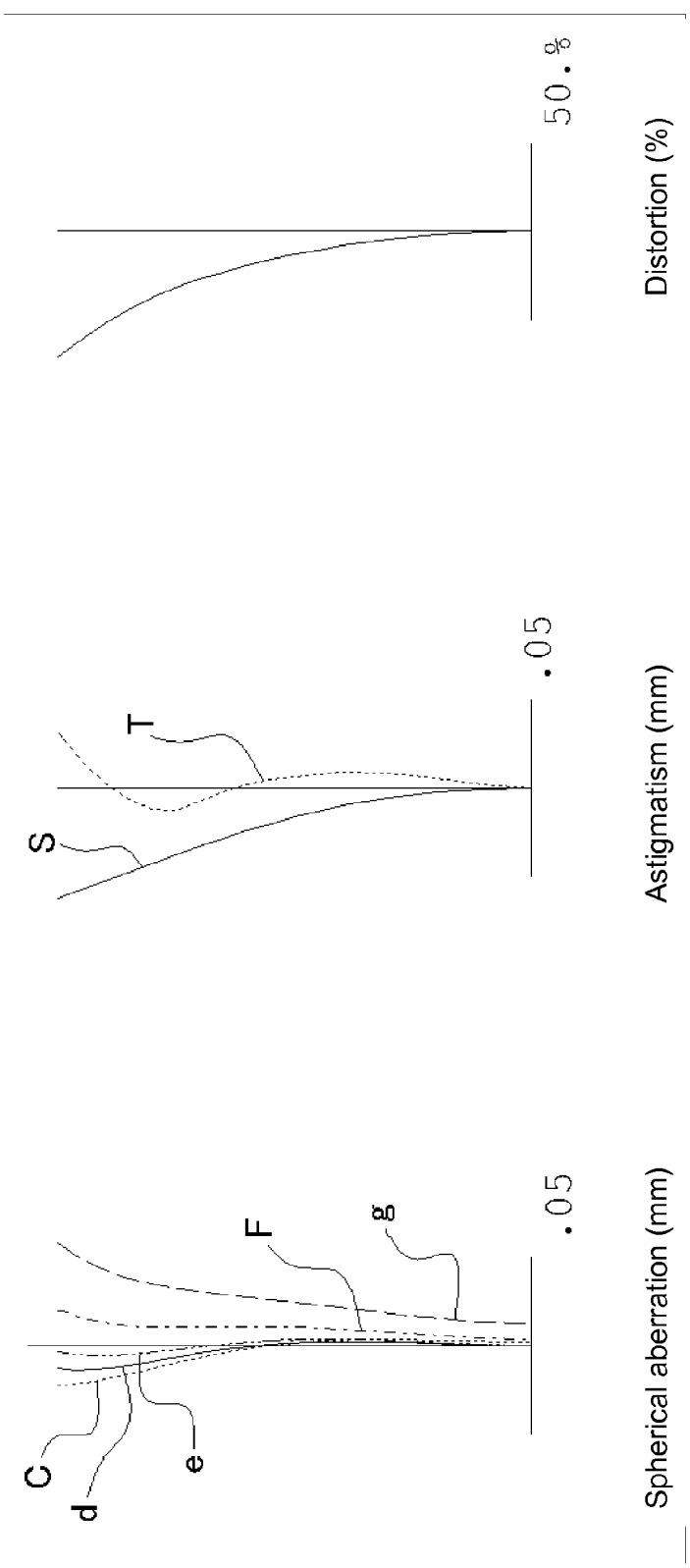
FIG. 15 is an aberration diagram showing a spherical aberration, an astigmatism, and a distortion of the imaging lens of FIG. 13.

FIG. 14 shows the lateral aberrations corresponding to the image height ratio H in the imaging lens of Numerical Data Example 5. Furthermore, FIG. 15 shows the spherical aberration (mm), the astigmatism (mm), and the distortion (%) of the imaging lens of Numerical Data Example 5, respectively. As shown in FIGS. 14 and 15, in the imaging lens according to the Numerical Data Example 5, the image surface is satisfactorily corrected and each of the aberrations is suitably corrected similarly to Numerical Data Example 1.

Accordingly, upon applying the imaging lens of the embodiment to an imaging optical system such as a vehicle onboard camera, a security camera, a video conference camera, a cellular phone, a digital still camera, a portable information terminal, a network camera and the like, it is possible to provide a downsized camera of which the aberrations are suitably corrected while obtaining a wide angle of view.

The present invention is applicable to an imaging lens mounted on a device such as the vehicle onboard camera, the security camera, the video conference camera and the like, which requires the imaging lens to have the wide angle of view as well as the aberrations being corrected suitably.

The disclosure of Japanese Patent Application No. 2011-142135, filed on Jun. 27, 2011, is incorporated in the application by reference.

While the invention has been explained with reference to the specific embodiments of the invention, the explanation is illustrative and the invention is limited only by the appended claims.

What is claimed is:

1. An imaging lens comprising:
a first lens having negative refractive power;
a second lens having positive refractive power;
a third lens having positive refractive power; and
a fourth lens having negative refractive power, arranged in this order from an object side to an image plane side,
wherein said first lens is formed in a shape so that a curvature radius of a surface thereof on the image plane side is positive,
said second lens is formed in a shape so that a curvature radius of a surface thereof on the object side and a curvature radius of a surface thereof on the image plane side are both negative,
said third lens is formed in a shape so that a curvature radius of a surface thereof on the object side is positive and a curvature radius of a surface thereof on the image plane side is negative,
said first lens has a focal length f1 so that the following conditional expression is satisfied:

$-3.0 < f1/f < -1.5$ where f is a focal length of a whole lens system,
said second lens has the surface thereof on the object side away from the surface thereof on the image plane side by a distance d3 that is defined as a distance on an optical axis from the surface of the second lens thereof on the object side to the surface of the second lens on the image plane side so that the following conditional expression is satisfied:

$1.0 \leq d3/f < 2.0$, and said third lens has a focal length f3 and the fourth lens has a focal length f4 so that the following conditional expression is satisfied:

$|f3/f4| < 0.8$.

2. The imaging lens according to claim 1, wherein said second lens has a focal length f2 and said third lens has a focal length f3 so that the following conditional expression is satisfied:

$0.2 < f3/f2 < 0.6$.

3. The imaging lens according to claim 1; wherein said second lens has an Abbe number vd2 and said third lens has an Abbe number vd3 so that the following conditional expression is satisfied:

$0.7 < vd2/vd3 < 1.4$.

* * * * *